United States Patent
Bernstein et al.

(10) Patent No.: US 7,303,226 B2
(45) Date of Patent: Dec. 4, 2007

(54) TRUCK WORK OFFICE FOR MOBILE VEHICLE

(75) Inventors: William M. Bernstein, Pittsburgh, PA (US); Catherine Sun, Cambridge, MA (US); Zachary Beard, Port Matilda, PA (US); Rebecca Nathenson, Woodside, CA (US); Rachel Lin, Emeryville, CA (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 24 days.

(21) Appl. No.: 11/396,857

(22) Filed: Apr. 3, 2006

(65) Prior Publication Data

US 2006/0226670 A1   Oct. 12, 2006

Related U.S. Application Data

(60) Provisional application No. 60/669,410, filed on Apr. 7, 2005.

(51) Int. Cl.
*B60N 2/32* (2006.01)
*B60N 3/00* (2006.01)

(52) U.S. Cl. .............. 296/190.01; 296/24.39; 296/37.15; 296/65.05; 296/69

(58) Field of Classification Search ............ 296/24.39, 296/190.01, 37.15, 65.01, 65.05, 65.15, 64, 296/69; 297/167, 163, 135, 144, 146; 224/275
See application file for complete search history.

(56) References Cited

U.S. PATENT DOCUMENTS

| | | | | |
|---|---|---|---|---|
| 3,463,539 A | * | 8/1969 | Colchin et al. ............. | 296/174 |
| 4,832,241 A | * | 5/1989 | Radcliffe ..................... | 224/275 |
| 5,197,774 A | * | 3/1993 | Diaz ......................... | 296/24.39 |
| 5,551,616 A | * | 9/1996 | Stitt et al. .................... | 224/275 |
| 5,560,676 A | * | 10/1996 | Griffith et al. ........... | 297/188.2 |
| 5,660,310 A | * | 8/1997 | LeGrow ..................... | 224/275 |
| 5,984,404 A | * | 11/1999 | Novoa et al. .......... | 296/190.02 |
| 6,059,358 A | * | 5/2000 | Demick et al. ........ | 297/188.04 |
| 6,135,546 A | * | 10/2000 | Demtchouk ................. | 297/135 |
| 6,406,084 B1 | * | 6/2002 | de Campos et al. .......... | 296/66 |
| 6,692,051 B1 | * | 2/2004 | Cook et al. .............. | 296/24.39 |
| 6,830,292 B1 | * | 12/2004 | Yoda ..................... | 297/188.06 |
| 6,860,550 B2 | * | 3/2005 | Wojcik ....................... | 297/163 |
| 2002/0043826 A1 | * | 4/2002 | Ingram et al. .............. | 297/146 |
| 2004/0245797 A1 | * | 12/2004 | Bixby ..................... | 296/37.15 |

FOREIGN PATENT DOCUMENTS

EP        000492281 A2 *  7/1992     ................ 297/146

* cited by examiner

Primary Examiner—Dennis H. Pedder
Assistant Examiner—Greg Blankenship
(74) Attorney, Agent, or Firm—Jeffrey P. Calfa; Gerald W. Askew

(57) ABSTRACT

A truck work office solution for a mobile vehicle. The work-station will take advantage of existing adjustability features on the passenger seat so that the height of the work-surface can be customized for each driver, and swivel to point toward the rear of the cab as well. The passenger seat itself converts into a work station. The driver seat may be swiveled to face the passenger seat that converts into an office area. The passenger's seat is normally a static element present in all cabs, and certainly in the case of single drivers it remains unused for its intended purpose. Because drivers are bound to the driver's seat, they use the close proximity of the passenger's seat to make peripheral tasks and items more convenient. The conversion provides a sliding work surface, storage, as well as power outlets.

12 Claims, 7 Drawing Sheets

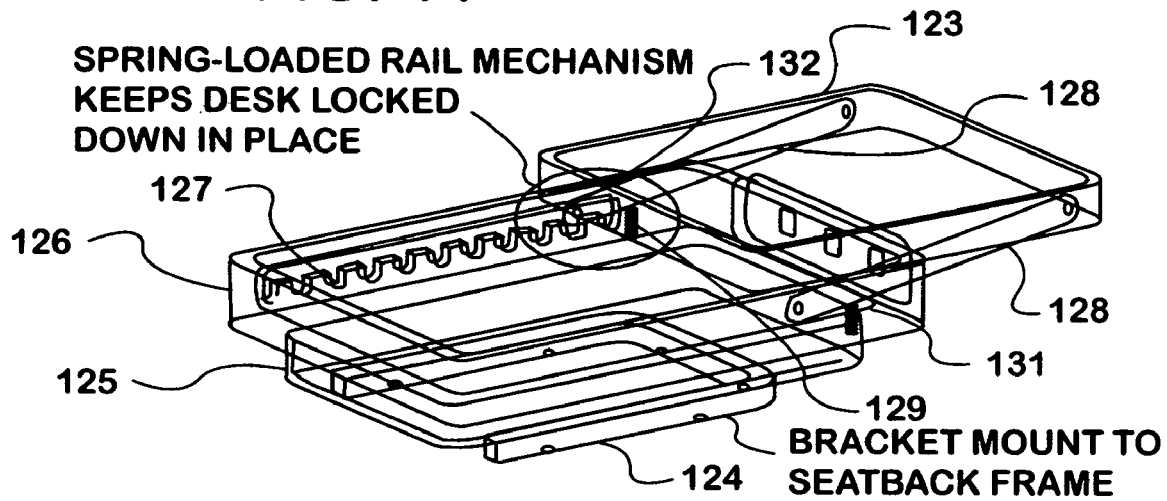
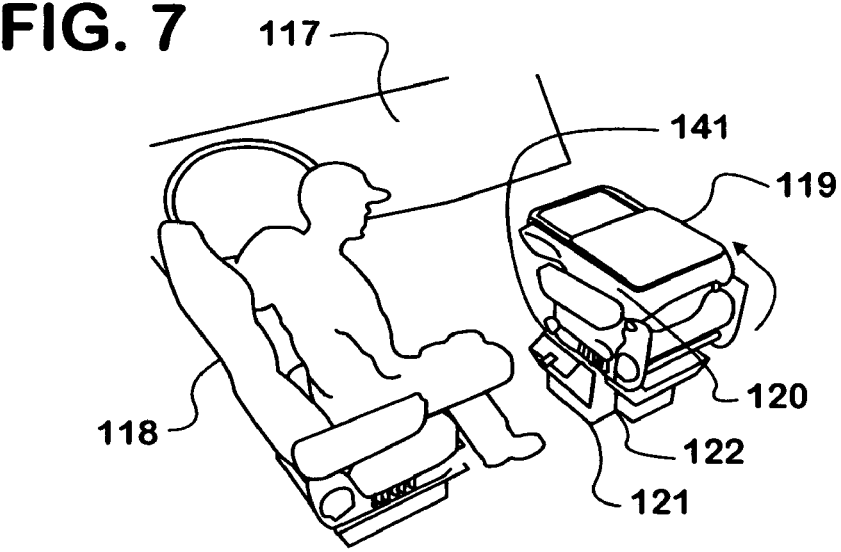
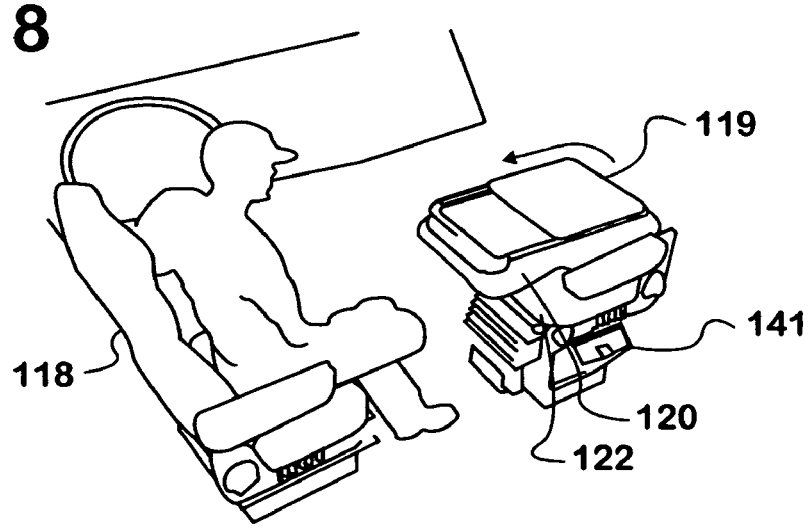

TRUCK WORK OFFICE FOR MOBILE VEHICLE

This patent issues from a non-provisional patent application claiming the priority of provisional patent applications Ser. No. 60/669,410, filed Apr. 7, 2005.

BACKGROUND

Trucks carry a bulk of the goods within the United States. Driver's have a difficult lifestyle in which they spend much of their time within the cab and sleeper of their over the road tractor trailers. They must comply with federal regulations in the United States that limit the amount of time behind the wheel. Exploratory research pointed the inventors to an opportunity to create a more efficient work space for truck drivers in their truck cabs. Many drivers build make shift solutions to stay organized in their limited living environment. Recent changes in federal regulations demand accurate accounting of driving time and mileage on the road, but drivers typically must create much of their own record keeping systems. So, while work organization styles and systems greatly vary per driver, their output must conform to industry standards and be highly accurate, as there are great penalties for inconsistencies and missing information. The intent of the research was to gain a better insight into how truck drivers view their (non-driving) work, understand what constitutes a desirable work space, and determine what constitutes a desirable work space, and determine what aesthetic would be appropriate for the truck cab, which serves as both home and office. This invention and the project that it sprang from created a new work-space for truck cabs that repurposes an under-utilized passenger seat and transforms it into a versatile workstation that a truck driver can use from his or her own driver's seat. This concept will consolidate most non-driving work into one centralized area, and provide a sturdy work-surface that can be adjusted for ergonomically-correct usage. Key product features will focus on paperwork organization, storage, power supply, and convenient access to frequently-used items.

The inventors found that truck drivers overwhelming want to work from "the captain's chair," (i.e. the driver's seat) and have everything within arm's reach. This product will give them a true work-space solution without taking up any extra space in the cab. For solo drivers, the passenger seat inevitably becomes ad hoc storage for most-frequently used items. By integrating storage options into and around the passenger seat area, the driver can now have a defined, organized system to work with. A convenient element of portability is added by a clipboard-caddy, which holds papers and pens and docks into the workstation unit.

SUMMARY

This invention relates to a truck work office solution for a mobile vehicle. The work-station will take advantage of existing adjustability features on the passenger seat so that the height of the work-surface can be customized for each driver, and swivel to point toward the rear of the cab as well. The passenger seat itself converts into a work station. The driver seat may be swiveled to face the passenger seat that converts into an office area. The passenger's seat is normally a static element present in all cabs, and certainly in the case of single drivers it remains unused for its intended purpose. Because drivers are bound to the driver's seat, they use the close proximity of the passenger's seat to make peripheral tasks and items more convenient. The conversion provides a sliding work surface, storage, as well as power outlets.

DRAWINGS

Other objects and advantages of the invention will become more apparent upon perusal of the detailed description thereof and upon inspection of the drawings, in which:

FIG. 7 is a rear perspective view of the combination truck work office for a mobile vehicle of FIG. 1 with the seats in an initial transition to the work office mode position with a driver shown in the drivers seat.

FIG. 8 is a rear perspective view of the combination truck work office for a mobile vehicle of FIG. 1 with the seats in an initial transition from that shown in FIG. 7 to the work office mode position.

FIG. 11 is an underside partial view of sliding work surface portion of the combination truck work office for a mobile vehicle shown in FIG. 9.

DESCRIPTION OF INVENTION

Figure 1:
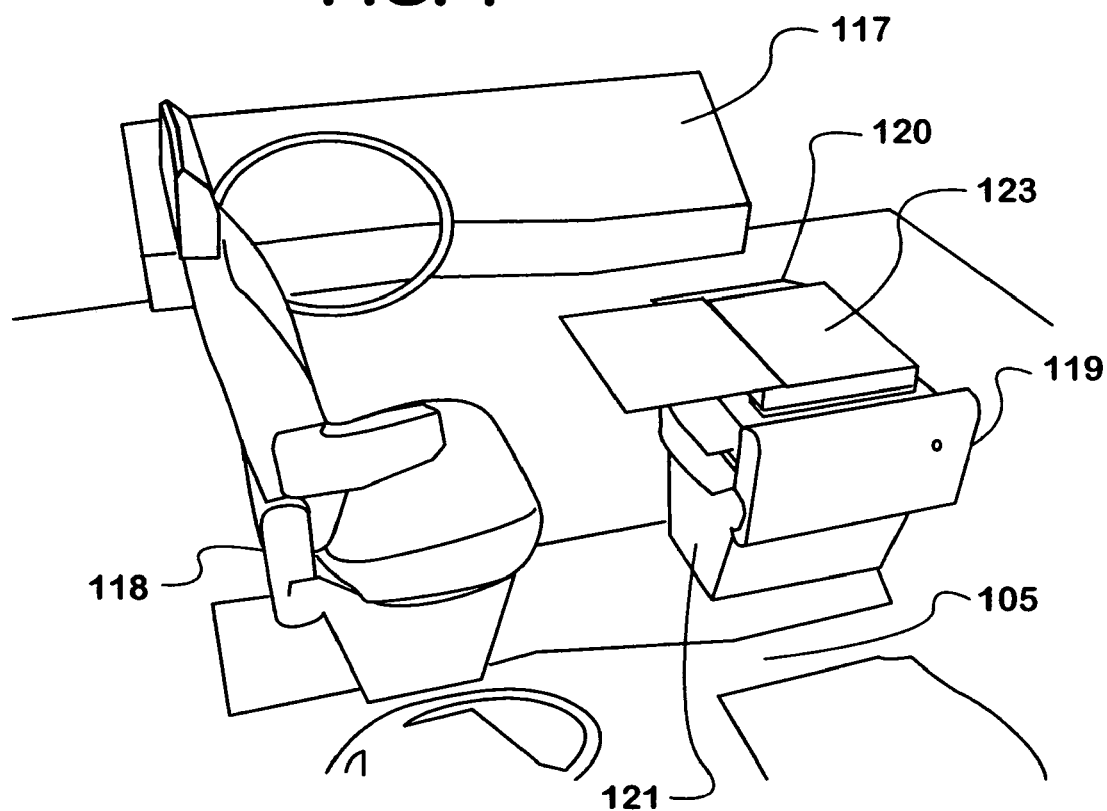
FIG. 1 is a rear perspective view of a truck work office for a mobile vehicle made in accordance with this invention.
Figure 2:
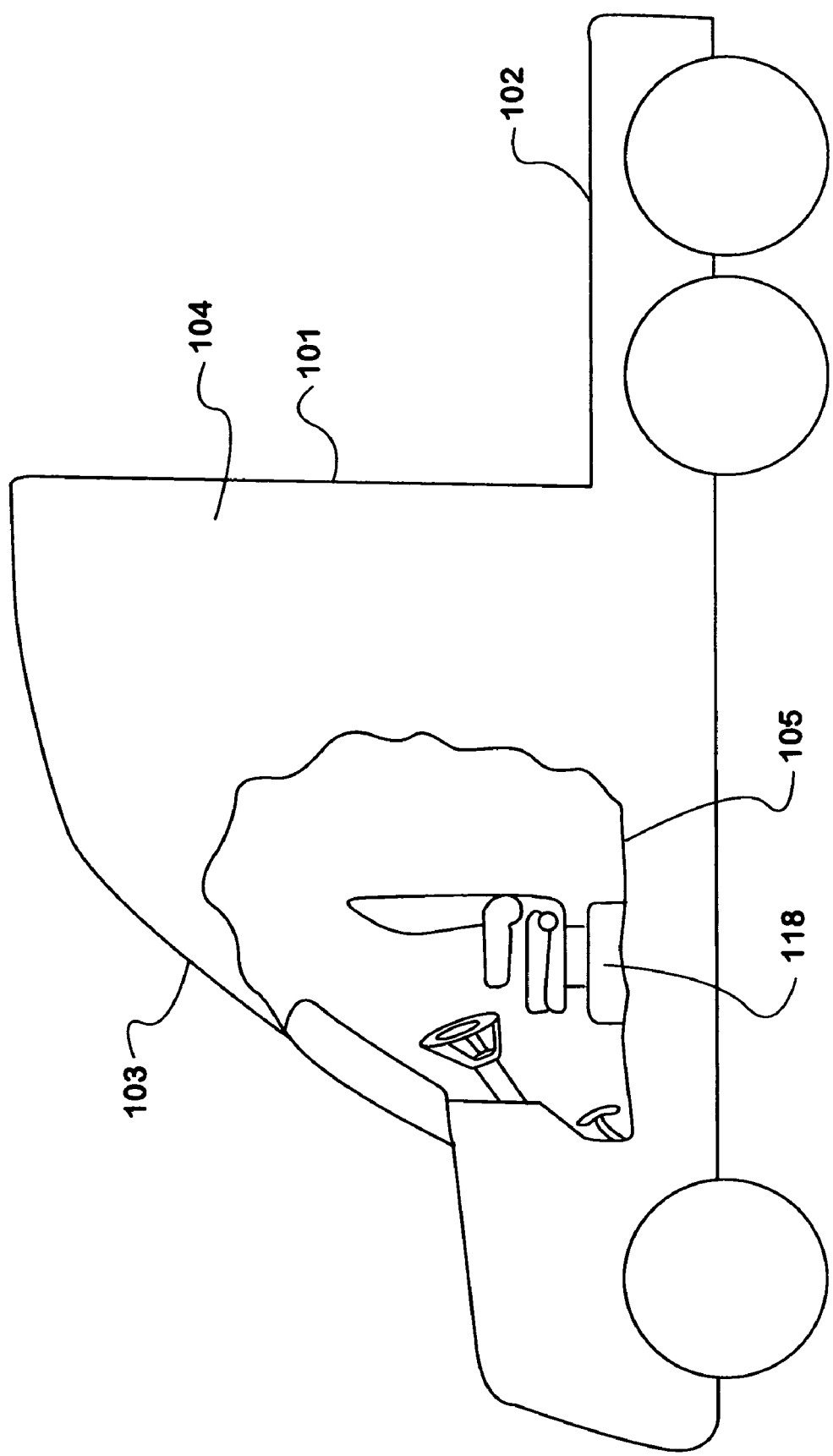
FIG. 2 is a side view of a mobile vehicle with the truck work office shown in FIG. 1 installed.

A motor vehicle 101, specifically a truck or tractor trailer, includes a cab 103 engaged to a drive train bearing chassis 102 (see FIG. 2). For over the road tractors, there may be a sleeper compartment 104 that includes driver living space. The cab 103 includes a mounting floor 105. The vehicle 101 shown in FIG. 2 has a combination truck work office made in accordance with the invention resting on the mounting floor 105 and mounted within the cab 103. The combination truck work office, shown in FIGS. 1, and 3 to 12, includes a rotatable driver's seat 118 and a convertible passenger seat 119. The driver's seat 118 faces the front of the truck, specifically a dashboard 117 when the combination truck work office is in driving mode position as shown in FIGS. 2, 3, 4, and 5. The driver's seat 118 may be rotated to face the convertible passenger seat 119 as shown in FIGS. 1, 6, 7, and 8.

The convertible passenger seat 119 in all embodiments includes a desk surface 123 that becomes available to the driver upon folding the seat forward from the position that would allow seating. The desk surface for the driver is slidably located on a rearward side of a seatback portion 120 of the convertible passenger seat 119. In the embodiment shown in FIGS. 1, 3, 4, 13, and 14, the passenger seat 119 does not have to rotate to make the desk surface 130 accessible to the driver. The convertible passenger seat 119 is comprised of a base 121 that is connected or connectable to the mounting floor 105 of the cab 103. A horizontal lower supporting surface 122 is connected to an upper surface of the base 121. There is seatback portion 120 that is vertical when the convertible passenger seat 119 is in the driving mode. The seatback portion 120 is engaged to rotate about the base 121 as shown in FIG. 4. A slidable desk surface 123 is engaged to a rearward side of the seatback portion 120.

Figure 3:
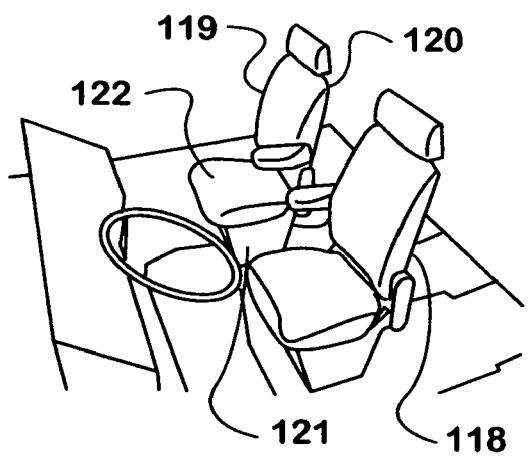
FIG. 3 is a front perspective view of the combination truck work office for a mobile vehicle of FIG. 1 with the seats in the driving mode position.
Figure 4:
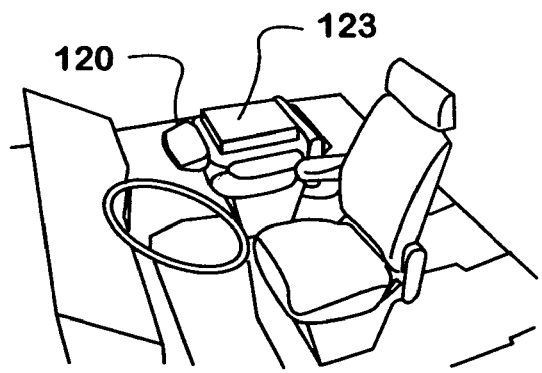
FIG. 4 is a front perspective view of the combination truck work office for a mobile vehicle of FIG. 1 with the seats in transition from the driving mode position.
Figure 13:
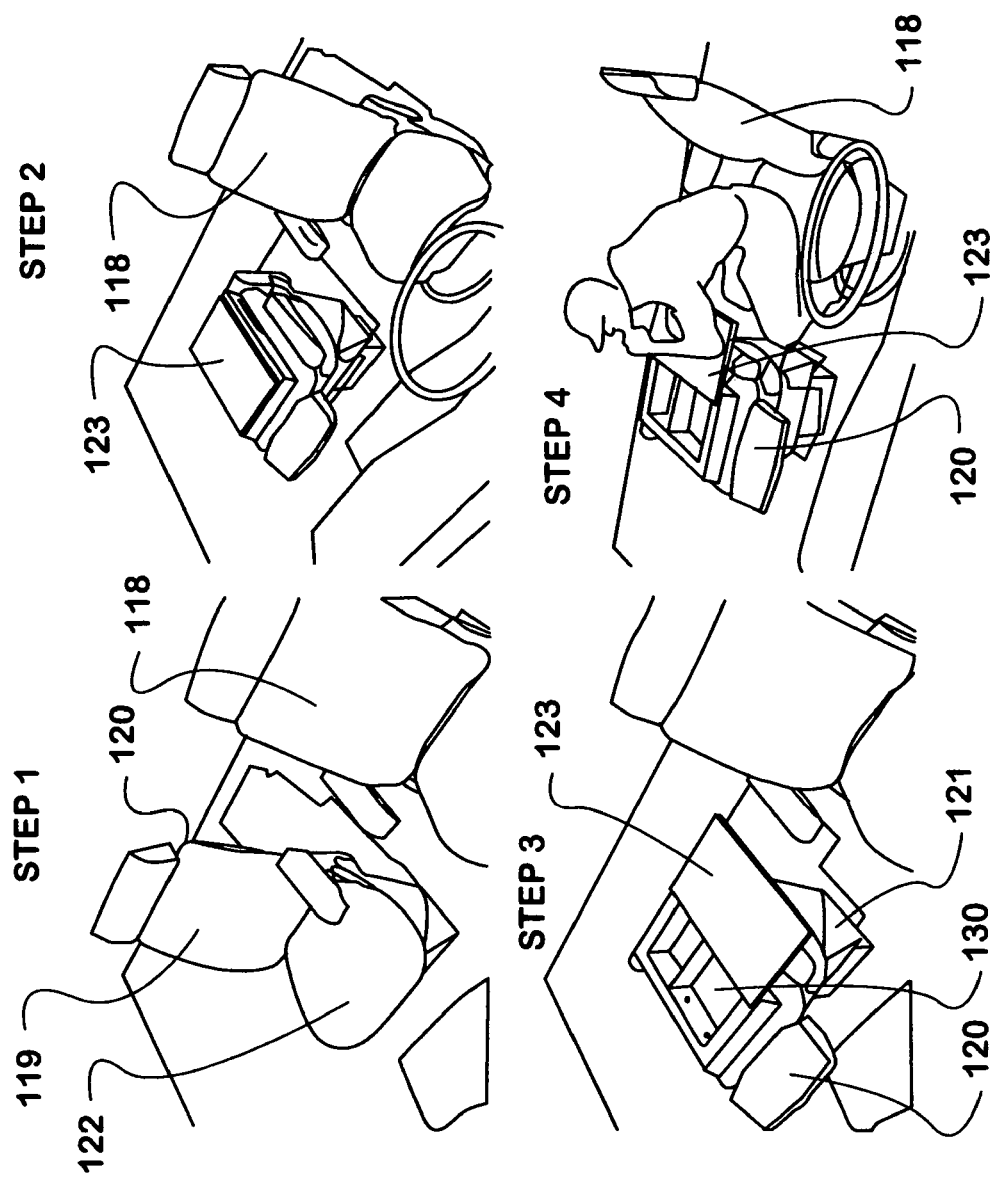
FIG. 13 shows a top down transition of a second embodiment of a combination truck work office for a mobile vehicle from driving mode to work office mode position.

The embodiment of the convertible passenger seat 119 shown in FIGS. 1, 3, and 4 is shown in transition from a driving mode to a work office mode in FIG. 13. In step 1, the driver's seat 118 faces forward towards a dashboard 117. The convertible passenger seat 119 has the seatback portion 120 in the vertical position so that a passenger or assistant driver may sit on the lower supporting surface 122. In step 2, the seatback portion 120 has been swung forward about the base 121. The desk surface 123 becomes visible to a driver. In step 3, the desk surface 123 is slid towards the driver's seat 118 about a sliding mechanism, one embodiment that will be discussed further below. The sliding of the desk surface 123 reveals storage compartments 130 that may be used to store PC as well as writing tools and paper, notebooks, and logs. In step 4, the driver's seat 118 is rotated towards the convertible passenger seat 119 completing the transition to the work office mode. The driver may do office work from the driver's seat 118.

One mechanism for providing allowing the desk surface 123 to slide towards the driver is shown in FIG. 11. A bracket mount 124 is mountable to the rear of a seatback portion 120. A storage area base 125 is engaged to the bracket mount 124. A fixed indexing base 126 is further engaged to the storage area base 125. The fixed indexing base has indexing rails 127 along which a desk surface 123 may slide. The indexing rails 127 contain detents at a set interval. The desk surface 123 has two indexing braces 128 engaged to an underside of the desk surface 123. Indexing pins 132 are engaged at the end of each indexing brace 128 at the end opposite that which is attached to an underside of the desk surface 123. The indexing pins 132 fit within the detents in the indexing rails. The indexing pins 132 are urged into the detents through springs 129 which are engaged between the indexing braces 128 and the fixed indexing base 126. The springs 129 lock the indexing pins 132 detents in the indexing rails 127 hence locking the desk surface 123 in a desired position, whether that put fully extended, partially extended, or in a stowed position. The indexing pins 132 may be manually released by applying upward force on the indexing braces. A power supply outlet pack in 131 may be engaged to a forward portion of the fixed indexing base 126. PCs or other electronic devices may be plugged into the power supply outlet pack 131. Power for the power supply outlet pack 131 comes from the vehicle electrical system through similar wiring as used for operation of power seats.

Figure 5:
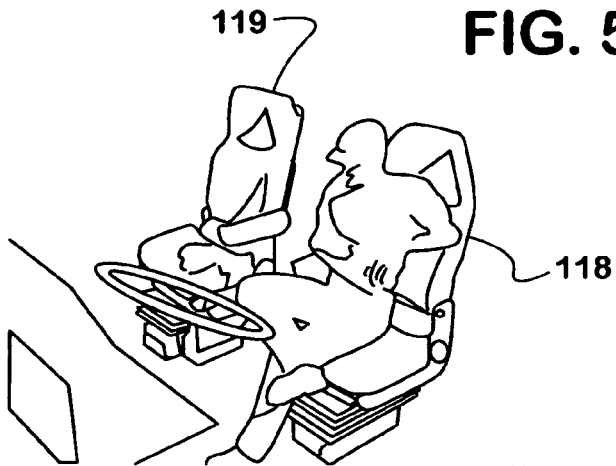
FIG. 5 is a front perspective view of the combination truck work office for a mobile vehicle of FIG. 1 with the seats in the driving mode position with a driver shown in the drivers seat.
Figure 6:
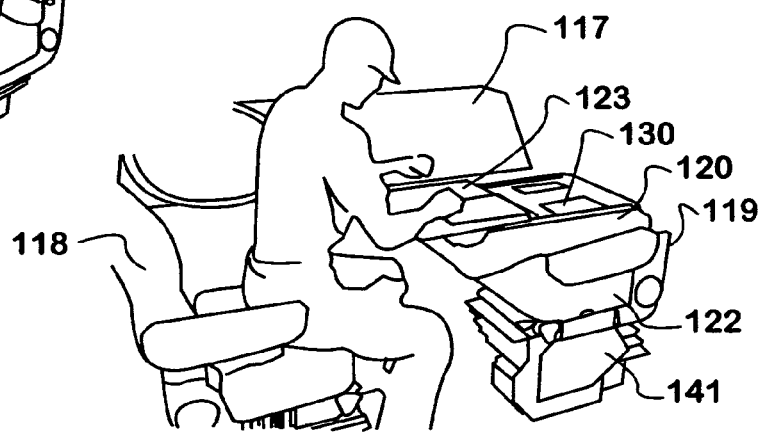
FIG. 6 is a rear perspective view of the combination truck work office for a mobile vehicle of FIG. 1 with the seats in the work office mode position with a driver shown in the drivers seat.
Figure 9:
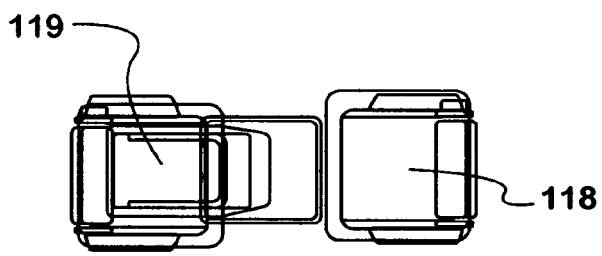
FIG. 9 is a top down view of one embodiment the combination truck work office for a mobile vehicle of FIG. 1.
Figure 10:
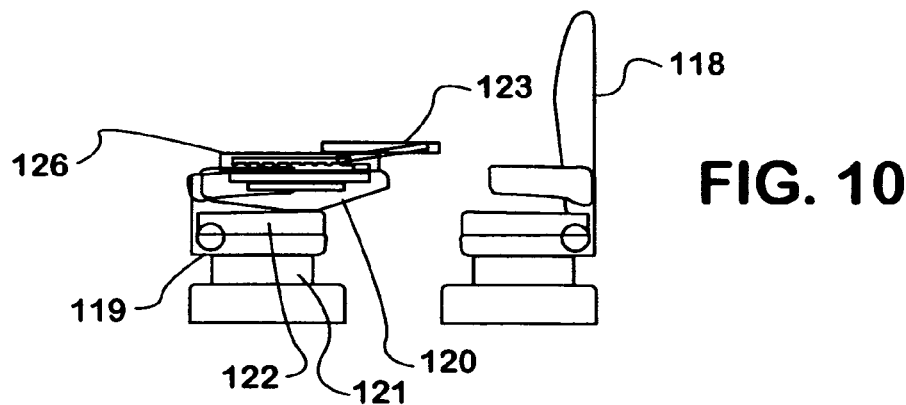
FIG. 10 is a side view of the embodiment of the combination truck work office for a mobile vehicle shown in FIG. 9.
Figure 12:
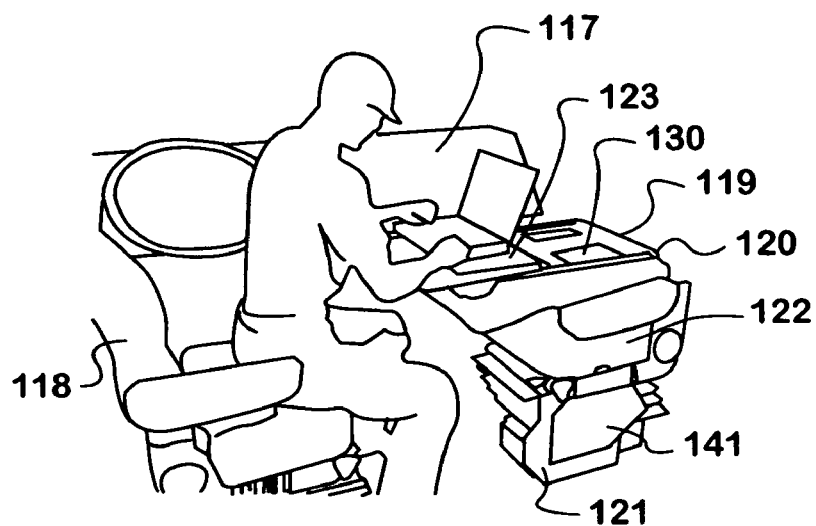
FIG. 12 is a rear perspective view of the combination truck work office for a mobile vehicle of FIG. 1 with the seats in a final transition from that shown in FIG. 8 to the work office mode position.
Figure 14:
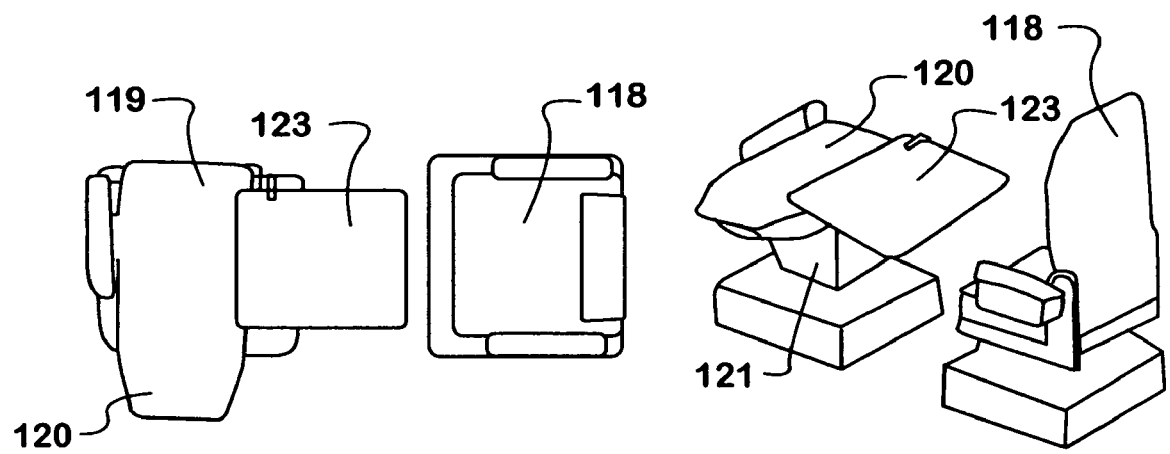
FIG. 14 is perspective view of the second embodiment the combination truck work office for a mobile vehicle shown in FIG. 13.

A second embodiment of the convertible passenger seat 119 is shown in FIGS. 5 to 10. In this embodiment, the convertible passenger seat 119 is rotatable towards the driver's seat 118. FIG. 5 shows the driver's seat 118 and the convertible passenger seat 119 in a driver's mode position. In FIG. 6, the driver's seat 118 is rotated towards the convertible passenger seat 119 and the convertible passenger seat 119 is rotated towards the driver's seat 118 with a desk surface 123 slid over the top of a seatback portion 120 towards the driver's seat. This embodiment provides more leg room for the driver. FIGS. 7 and 8 show the transition between the driving mode and work office modes of FIGS. 5 and 6. A sliding mechanism on the back of the seatback portion 120 allows the desk surface to be slid over the top (top in the driving mode) of the seatback portion 120 towards the driver, when the seatback portion is rotated towards a lower supporting portion 122.

Figure 15:
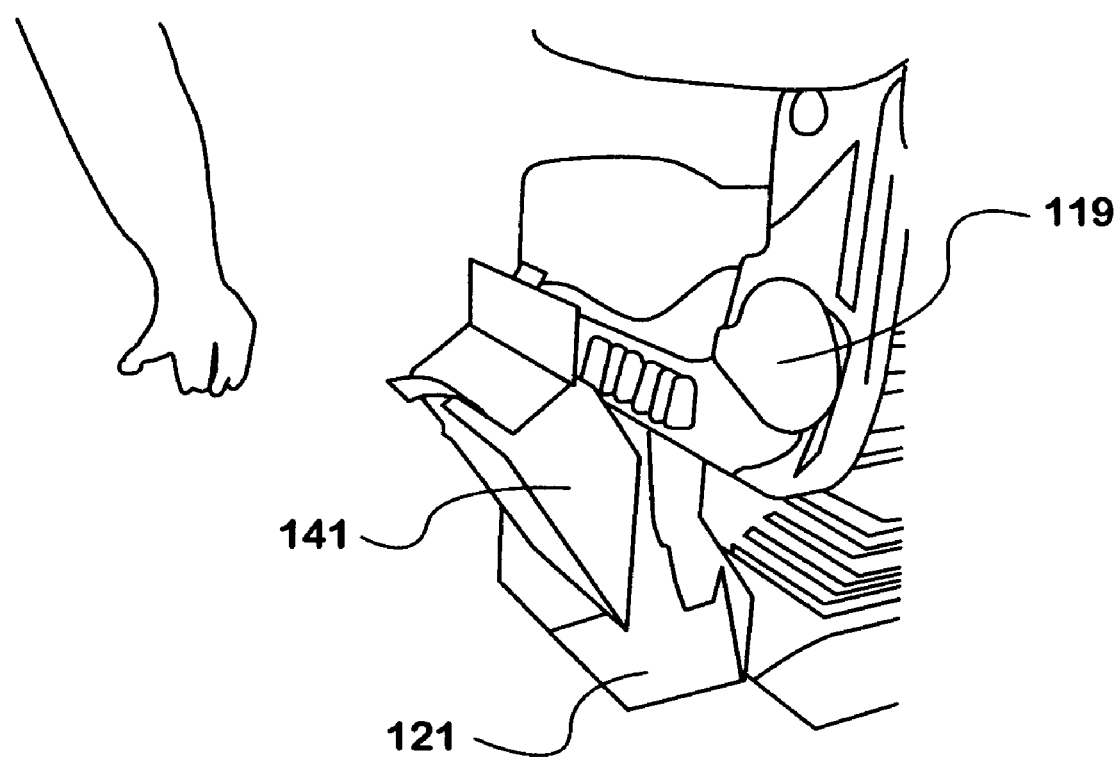
FIG. 15 is a partial view of a side of the combination truck work office for a mobile vehicle of FIG. 1 with a storage pockets shown.

FIG. 15 shows an angled pocket 141 in the side of a base 121 of the convertible passenger seat 119. The pocket 141 is directed at an up angle towards the driver's seat 118. A driver may store paperwork in the angled pocket 141, when the driver's seat 118 is in a driving position.

A new work-space for truck cabs that repurposes an under-utilized passenger seat and transforms it into a versatile workstation that a truck driver can use from his own driver's seat. This concept will consolidate most non-driving work into one centralized area, and provide a sturdy work-surface that can be adjusted for ergonomically-correct usage. Key product features will focus on paperwork organization, storage, power supply, and convenient access to frequently-used items.

We found that truck drivers overwhelming want to work from "the captain's chair," and have everything within arm's reach. This product will give them a true work-space solution without taking up any extra space in the cab. For solo drivers, the passenger seat inevitably becomes ad hoc storage for most-frequently used items. By integrating storage options into and around the passenger seat area, the driver can now have a defined, organized system to work with. A convenient element of portability is added by a clipboard-caddy, which holds papers and pens and docks into the workstation unit.

The truck office work station has unique features and attributes. The work-station will take advantage of existing adjustability features on the passenger seat so that the height of the work-surface can be customized for each driver, and swivel to point toward the rear of the cab as well. Electronic wiring to heat the seat cushions will extend to a 2-plug 250 W power supply in the work-station for laptops and small electronic devices. The configuration of the product allows for a 15" LCD screen to be embedded into the work-station in the future. The feature list:

Storage options for: paperwork, logbooks, laptop, pens/pencils, Qualcomm, calculator, and clipboard.

Work-surface has adjustable height range of 7" and reach range (distance to driver) of 16".

Minimum of 2 power plugs (maximum 250 W).

Portable clipboard-caddy that docks into storage unit.

Can accommodate an integrated 15" LCD screen in the future.

The proposed solution combines the work-related amenities of a well-arranged workstation with the lifestyle comforts of the passenger's seat. The challenge is to create a product that appears equally elegant in both modes, and transitions between the two with surprising and pleasing ease. Human factors, the product form, and aesthetics must mesh to ensure that this hybrid product is graceful, rather than an awkwardly 'grafted' solution.

The first human factors concern, when the product opportunity addresses an expert user group such as long-haul truck drivers, is the users' psychological comfort and proficiency with the status quo. The truck environment has a well-established 'cast of characters':

The driver's seat is unanimously considered the most comfortable seating location in the truck. As such, a majority of drivers finds it easiest and most pleasing to do non-driving work tasks while in the driver's seat.

The passenger's seat is a static element present in all cabs, and certainly in the case of single drivers it remains unused for its intended purpose. The result is that all drivers, to varying degrees, find ways of using the passenger's seat for alternate purposes to suit their needs. Because drivers are bound to the driver's seat, they use the close proximity of the passenger's seat to make peripheral tasks and items more convenient.

Half of these alternate purposes are rooted in lifestyle concerns: a resting place for a beverage thermos, the snack of the moment, personal items such as stuffed animals. Hygiene items such as facial tissues are also prevalent.

The other significant user repurposing concerns work-related needs. The passenger's seat becomes storage for paperwork, receipts, the logbook, maps, directions, and the road atlas. The steering wheel, the driver's main tool during the work day, is designed and positioned in the most ergonomic way of anything related to the driver's seat. Therefore, drivers have become comfortable with using it as a surrogate writing surface, leaning a clipboard on top of it to fill out forms and perform other non-driving office tasks. This seems to be a norm within trucker work culture, and truly is the path of least resistance when the driver seeks to accomplish non-driving work tasks. OEM workstations, located in the sleeper area and using the bunk for seating, tend to fall short of the comfort and convenience of the driver's seat and the steering wheel.

Because the status quo of the truck cab is so ingrained in drivers' behavior, we have elected to use these norms to the drivers' advantage in our solution.

Use of the driver's seat. The new solution will utilize the driver's seat for what it does best. The driver will be comfortably seated there while using the product.

Use of the passenger's seat. The best solutions improvised by drivers repurpose the nearby passenger's seat, without destroying its usefulness as a seating device. The new solution will accomplish the same, maximizing the alternate purpose as a workstation while preserving the seating mode.

Prioritized items. Drivers optimize their workspace as best they can, keeping high-priority items nearby on the passenger's seat or floor. The new solution will support this practice, but will reduce the chaos, with accessible storage that elevates important items off the floor.

Ergonomics of non-driving work.

Task posture. The bunk, sans a backrest, makes an uncomfortable and fatiguing task seat that is poorly oriented to the roll-out writing surface. The new solution makes use of existing fixtures and space in the truck, to enable an ergonomic posture during non-driving work tasks. The new workstation's core technology makes it possible to bring the writing surface closer and higher in relation to the driver.

Physical effort versus desirability. The conversion of the passenger's seat into a workstation will require some physical effort by the truck driver. The team has already developed multiple solutions for this conversion, some which incorporate a swiveling passenger's seat and some which rely more heavily on articulating work surfaces. It remains to be determined in Phase Four, through prototype testing, which solution requires the least effort of the driver in exchange for the greatest benefit. Ergonomic safety will also have to be tested.

Driver-accessible items. Tasks that are peripherally related to driving require some materials to be accessible whether the new workstation is deployed, or in hide-away mode as a passenger's seat. These items—the clipboard/caddy and Qualcomm unit—will be accommodated in locations underneath the seat pan, available when the overall product is in either mode.

There are a number of promising opportunities that the solution can address through its aesthetics. The team has identified key factors that will drive the product aesthetics in Phase Four, while the solution is realized.

Considering the lifestyle aspect of work. The nature of the trucker's job is that one's job and one's daily living have to be carried out in the same space. In addition, the truck driver's job is inherently solitary—there are no co-workers or boss present to monitor the driver's behavior. For these reasons, the job-related components of the cab can take on a lifestyle-related quality that could make non-driving work tasks less threatening and even appealing to the truck driver.

Level of polish. Currently, drivers create all sorts of custom solutions for their non-driving work that can be described as improvised, ramshackle, and temporary. They can also be described as custom, personalized, and optimized for the individual user.

Our solution has the opportunity to be the integrated, permanent product that drivers' solutions aim to fulfill. Our solution should shun the after-market appearance of related solutions currently on the market, such as the various work caddies and cases benchmarked during Phase Two. In this way, the solution becomes an attractive feature that International can provide directly to customers. Conversely, our solution should consider the individual driver's style. A solution that seems too generic and factory-made will be unappealing to drivers. This product will be a major point of user interaction during the truck driver's work day, and a generic solution will not deliver the message that the product's maker cares about the user's individual needs. Therefore, the level of polish for the solution must be tested in Phase Four to arrive at a comfortable balance of sleekness and charm.

Variability in the product's outward identity. Due to the large markets to which they sell, a truck manufacturer's strategy may be to design the cab interior so that parts can be swapped and removed, for mass customization. Our solution can utilize the same thinking, in terms of aesthetic material use. Just as the appearance of the truck and its driver deliver a message about the fleet company, any job-related product that the driver uses becomes a component of this message.

By incorporating set areas of the product where surface materials can be swapped out—according to the specifications of the customer—our solution can take on the desired appearance of the individual customer. Some simple material applications can deliver a succinct message. Just three basic material zones and a short list of options can provide enough permutations to let the product take on many different variations.

Material choice is a variable where our solution has the potential to make a bold brand statement. The team's product presents a chance to explore the use of this existing catalog in new ways, which will tie the product to its environment and to International. The exploration of new, more office-related materials can also introduce a feeling of productivity and accomplishment that the driver may appreciate.

The new workstation is a high-function product, and its outer form will largely conform to the core technology inside. The form must lend to the product's smooth transition between its two main states of seat and workstation. However, it must still have an appearance of comfort as a chair, and an appearance of prestige as a workstation. The cost to achieve this should hover around a combination of the cost to produce a regular passenger's seat and the current driver's side desk/cabinet unit. The converting desk components of this new workstation should not require more material than the existing desk/cabinet unit comprises. However, the greater number of parts that will compose the new product, and the greater precision required for the articulating parts involved, may inflate costs.

Overall dimensions of the main assembly in a preferred embodiment will be approximately: 8" deep×25" long×18" wide. The desk surface will travel out a minimum of 16" toward the driver, and will index into locked positions along side rails. When fully extended, the desk surface plus the lidded storage area that it reveals underneath, adds up to table space of approximately 17"×34". At full extension, at least half of the desk surface will be fully supported by the headrest of the seat (see drawing below). The height of the desk surface can be adjusted by. using the existing Air Ride seat height controls. This gives a 7" range of height adjustability, according to the National Seating product specification brochure (see Appendix 8). The desk surface will be spring-loaded in tension such that the driver must pull up on, or squeeze side handles, to disengage the desk from its indexed position before sliding the desk forward or back.

The internal framework of the seatback will only need slight modifications to allow for the attachment of the main assembly mounting-bracket. This bracket should not interfere with the air bladder lumbar support components. At the bottom sides of the seatback, the structural components of the recline sub-assembly will need to be redesigned so that the passenger seat can lock in both the upright position, and the folded-down position.

Major components may include:
main storage—for laptop & paperwork (injection-molded plastic, possibly ABS)
storage compartment lids (injection-molded plastic, possibly clear polycarbonate or clear ABS)
desk surface, approximately 18"×18" (injection-molded plastic, ABS or nylon)
side rails (stamped cold-rolled steel)
mounting bracket (bent-tubing, box-section steel)
tensions springs
power supply sub-assembly parts
large side storage sub-assembly parts
small front-storage sub-assembly parts
portable caddy/clipboard sub-assembly parts
fold-down seatback locking mechanism subassembly There may be a minimum of 2 power plugs on the main assembly with a maximum capacity of 250 W. This power supply will be sufficient for essential work-related items such as: laptops, printers, cell-phone chargers, PDA chargers, etc. (A small television set can be plugged in as well.) Food preparation appliances such as coffee makers, microwaves, etc. are not to be used as their required wattage far exceeds 250 W. (Plugging in high wattage devices will trip the fuse, and not cause any harm.) This is also to discourage food and liquids from being prepared and spilled in the work area.

Plastic components can be injection-molded, or roto-molded. ABS can be used for non-load-bearing plastic components. Santoprene may be used where grips or non-slip surfaces are needed. Polycarbonate can be used where transparent parts are needed. Metal components can be either die-cast metal, cold-forged sheet metal, or bent tubing. The majority of the passenger seat construction may remain the same: a bent-tube frame with foam-padding, bladders for air lumbar support, heating elements in the seat cushion, and multiple fabric finishes to choose from. The workstation sub-assembly will fasten to the frame of the seat-back.

In construction of our new seat, the team will attempt to alter the minimum required of the current seat that is manufactured by National Seating. With the back support of the seat being approximately 3" thick, our outboard design of the work surface and storage area will not compromise on the comfort and safety of the current passenger seat, instead add depth to the seat.

In terms of safety issues, the seat will conform to Federal Motor Vehicle Safety Standards (FMVSS) 207, 210, and 302. These standards are in reference to seat systems, seatbelt assembly, and interior material usage.

Standard No. 207—Seating Systems—Trucks (Effective Jan. 1, 1972 ) This standard establishes requirements for seats, attachment assemblies, and installation, to minimize the possibility of failure as a result of forces acting on the seat in vehicle impact.

Complying with Standard 207.S4.3, the restraining device for the fold-down seat will need a self-locking device for restraining the seat back.

To make sure that our product does not harm the user, we need to adhere to Standard 207.S4.4 of conspicuously labeling the fold-down seat that is not designed for occupancy while the vehicle is in motion.

Standard No. 210—Seat Belt Assembly Anchorages—Trucks (Effective Jul. 1, 1971)

This standard establishes requirements for seat belt assembly anchorages to ensure proper location for effective occupant restraint and to reduce the likelihood of failure. The requirements apply to any component, other than the webbing or straps, involved in transferring seat belt loads to the vehicle structure.

The team will avoid interfering with the current position of the seat belt anchorages so as to eliminate the possibility of violating federal regulations. The workstation construction will work around the mechanical components of the lumbar support and anchorages of a default seat. That is, the caddy area at the base of the seat and the back rest of the seat is where innovation will occur.

Standard No. 302—Flammability of Interior Materials—Trucks (Effective Sep. 1, 1972)

This standard specifies burn resistance requirements for materials used in the occupant compartments of motor vehicles. Its purpose is to reduce deaths and injuries to motor vehicle occupants caused by vehicle fires, especially those originating in the interior of the vehicle from sources such as matches or cigarettes.

In our product, we will prototype the outboard workstation using materials that will conform to this standard since we will not have the time or resources to experiment with new materials. The materials used in the seat itself will remain as is.

The inventors took a step back to review our Value Opportunity Analysis to refine our definitions and goals after receiving input from International and faculty. With the work-space opportunity in mind, we set the goals to directly address the driver and fleet company, as they are our two primary stakeholders.

Goals Relating to the Driver:
Promotes a sense of organization and tidiness
Creates an intentional space for work, appropriate to the truck
Helps counter procrastination to keep up with paperwork
Accommodate the drivers' individual work style
Minimizes the need for the driver to create make-shift work-space solutions
Allows driver to perform non-driving work tasks effectively and efficiently
Provides access to information easily
Is intuitive, familiar, and obvious to use
Feels sturdy and solid
Positively affects the relationships with fellow employees in company operations and customers Goals Relating to the Truck Owner/Fleet Management:
Makes company look like an attractive employer that cares about its drivers.
Makes trucking industry look more professional.
Facilitates use of fleet's logistics solutions & paperwork requirements
Does not require excessive training from company to use.
Attracts younger, tech-savvy drivers to company.
Increases resale value based on desirable features. Maintains a professional look.
Increases confidence that the driver will be turning in correct and legal paperwork.
Increases confidence that the driver puts forth a professional image for the company.
Cannot be used inappropriately while in motion; does not interfere with driving responsibilities.
Appropriate to truck cab aesthetic. Not overly luxurious, but provides drivers with a sense that they're valued.

With our final concept of the passenger seat workstation, we addressed each goal to some extent but more directly to the following goals:
Drivers unhappy with level of respect from dispatch and clients
New technologies available to streamline work and help with multitasking
Federal regulations require complete accounting of time/mileage
Resale value of truck increasingly important to fleet owners As described above, the work office solution of this invention and vehicle made with the work office solution provide a number of advantages, some of which have been described above and others of which are inherent in the invention. Also modifications may be proposed to the work office solution of this invention and vehicle made with the work office solution without departing from the teachings herein.

We claim:

1. A work office for a mobile motor vehicle, the vehicle having a drivers cab compartment with a mounting floor and a rotatable driver's seat mounted to the mounting floor, comprising:
a support base for a convertible passenger seat connectable to the mounting floor of the cab;
a horizontal lower supporting surface connected to an upper surface of said base;
a seatback portion that is vertical when said convertible passenger seat is in a driving mode;
said seatback portion engaged to rotate in a forward direction about said base;
a slidable desk surface engaged to a rearward side of said seatback portion; and
said slidable desk surface slidable along a sliding mechanism to allow a driver access from the rotatable driver's seat when in a work office mode;
said sliding mechanism comprising a bracket mount engaged to a rear of said seatback portion;
a storage area base mounted to said bracket mount;
a fixed indexing base engaged to said storage area base;
said fixed indexing base having indexing rails along which said desk surface may slide;
said indexing rails containing detents at a set interval;
said desk surface having two indexing braces engaged to an underside of said desk surface, an end of each said indexing brace, at an end opposite that which is attached to an underside of said desk surface are indexing pins;
said indexing pins sized to fit within said detents in said indexing rails;
said indexing pins being forced into engagement with said detents through springs which are engaged between said indexing braces and said fixed indexing base; and
said springs for locking said indexing pins into detents in said indexing rails locking said desk surface in a desired position.

2. The work office of claim 1, further comprising:
a power supply outlet pack engaged to a forward portion of said fixed indexing base.

3. The work office of claim 2, further comprising:
an angled storage pocket in a side of a base; and
said pocket directed at an up angle towards the driver's seat.

4. A work office for a mobile motor vehicle, the vehicle having a drivers cab compartment with a mounting floor and a rotatable driver's seat mounted to the mounting floor, comprising:
a support base for a convertible passenger seat connectable in a rotatable manner to the mounting floor of the cab;
a horizontal lower supporting surface connected to an upper surface of said base;
a seatback portion that is vertical when said convertible passenger seat is in a driving mode;
said seatback portion engaged to rotate in a forward direction about said base;
a slidable desk surface engaged to a rearward side of said seatback portion; and
said slidable desk surface slidable along a sliding mechanism to allow a driver access from the rotatable driver's seat when in a work office mode;
said sliding mechanism comprising a bracket mount engaged to a rear of said seatback portion;
a storage area base mounted to said bracket mount;
a fixed indexing base engaged to said storage area base;
said fixed indexing base having indexing rails aiong which said desk surface may slide;
said indexing rails containing detents at a set interval;
said desk surface having two indexing braces engaged to an underside of said desk surface, an end of each said indexing brace, at an end opposite that which is attached to an underside of said desk surface are indexing pins;

said indexing pins sized to fit within said detents in said indexing rails;

said indexing pins being forced into engagement with said detents through springs which are engaged between said indexing braces and said fixed indexing base; and said springs for locking said indexing pins into detents in said indexing rails locking said desk surface in a desired position.

5. The work office of claim 4, further comprising:
a power supply outlet pack engaged to a forward portion of said fixed indexing base.

6. The work office of claim 5, further comprising:
an angled storage pocket in a side of a base; and
said pocket directed at an up angle towards the driver's seat.

7. A mobile vehicle in combination with a truck work office, comprising:
a cab engaged to a drive train bearing chassis;
said cab including a mounting floor;
a rotatable driver's seat mounted to said mounting floor;
a convertible passenger's seat comprised of a support base engaged to said mounting floor;
a horizontal lower supporting surface connected to an upper surface of said base of said convertible passenger's seat;
a seatback portion that is vertical when said convertible passenger seat is in a driving mode;
said seatback portion engaged to rotate in a forward direction about said base;
a slidable desk surface engaged to a rearward side of said seatback portion; and
said slidable desk surface slidable along a sliding mechanism to allow a driver access from said rotatable driver's seat when in a work office mode;
said sliding mechanism comprising a bracket mount engaged to a rear of said seatback portion;
a storage area base mounted to said bracket mount;
a fixed indexing base engaged to said storage area base;
said fixed indexing base having indexing rails along which said desk surface may slide;
said indexing rails containing detents at a set interval;
said desk surface having two indexing braces engaged to an underside of said desk surface, an end of each said indexing brace, at an end opposite that which is attached to an underside of said desk surface are indexing pins;
said indexing pins sized to fit within said detents in said indexing rails;
said indexing pins being forced into engagement with said detents through springs which are engaged between said indexing braces and said fixed indexing base; and
said springs for locking said indexing pins into detents in said indexing rails locking said desk surface in a desired position.

8. The mobile vehicle of claim 7, further comprising:
a power supply outlet pack engaged to a forward portion of said fixed indexing base;
said power supply outlet pack receiving power from said vehicle.

9. The mobile vehicle of claim 8, further comprising:
an angled storage pocket in a side of a base; and
said pocket directed at an up angle towards the driver's seat.

10. A mobile vehicle in combination with a truck work office, comprising:
a cab engaged to a drive train bearing chassis;
said cab including a mounting floor;
a rotatable driver's seat mounted to said mounting floor;
a convertible passenger's seat comprised of a support base rotatably engaged to said mounting floor;
a horizontal lower supporting surface connected to an upper surface of said base of said convertible passenger's seat;
a seatback portion that is vertical when said convertible passenger seat is in a driving mode;
said seatback portion engaged to rotate in a forward direction about said base;
a slidable desk surface engaged to a rearward side of said seatback portion; and
said slidable desk surface slidable along a sliding mechanism to allow a driver access from said rotatable driver's seat when in a work office mode;
said sliding mechanism comprising a bracket mount engaged to a rear of said seatback portion;
a storage area base mounted to said bracket mount;
a fixed indexing base engaged to said storage area base;
said fixed indexing base having indexing rails along which said desk surface may slide;
said indexing rails containing detents at a set interval;
said desk surface having two indexing braces engaged to an underside of said desk surface, an end of each said indexing brace, at an end opposite that which is attached to an underside of said desk surface are indexing pins;
said indexing pins sized to fit within said detents in said indexing rails;
said indexing pins being forced into engagement with said detents through springs which are engaged between said indexing braces and said fixed indexing base; and
said springs for locking said indexing pins into detents in said indexing rails locking said desk surface in a desired position.

11. The mobile vehicle of claim 10, further comprising:
a power supply outlet pack engaged to a forward portion of said fixed indexing base;
said power supply outlet pack receiving power from said vehicle.

12. The mobile vehicle of claim 11, further comprising:
an angled storage pocket in a side of a base; and
said pocket directed at an up angle towards the drivers seat.

* * * * *